United States Patent [19]

Ma

[11] Patent Number: 5,058,045
[45] Date of Patent: Oct. 15, 1991

[54] BATTERY AND EXPANSION SLOT CHANGEABLE COMPUTER

[76] Inventor: Hsi K. Ma, Chia Hsin Bldg. 2, No. 96, Rm. 813, Chung Shan N. Rd., Taipai, Taiwan, Taiwan

[21] Appl. No.: 491,321

[22] Filed: Mar. 9, 1990

[51] Int. Cl.⁵ .......................... G06F 1/00; H05K 7/00
[52] U.S. Cl. .................................... 364/708; 361/393
[58] Field of Search ................ 364/708, 707; 361/391, 361/393, 394, 395, 399

[56] References Cited

U.S. PATENT DOCUMENTS

| | | | |
|---|---|---|---|
| 4,530,066 | 7/1985 | Ohwaki et al. | 364/708 |
| 4,680,674 | 7/1987 | Moore | 364/708 |
| 4,858,162 | 8/1989 | Kieffer et al. | 364/708 |
| 4,908,637 | 3/1990 | Chung et al. | 361/394 |
| 4,991,058 | 2/1991 | Watkins et al. | 361/391 |

Primary Examiner—Dale M. Shaw
Attorney, Agent, or Firm—Bucknam and Archer

[57] ABSTRACT

A battery and expansion slot changeable computer mainframe structure for lap-top and note book, which includes receiving chambers having battery load circuit and contact end for expansion cards. Therefore, a variety of expansion cards and battery sets can be alternatively set in the receiving chambers to connect to the computer so as to extend power supply duration and strengthen the operational function of the computer.

3 Claims, 5 Drawing Sheets

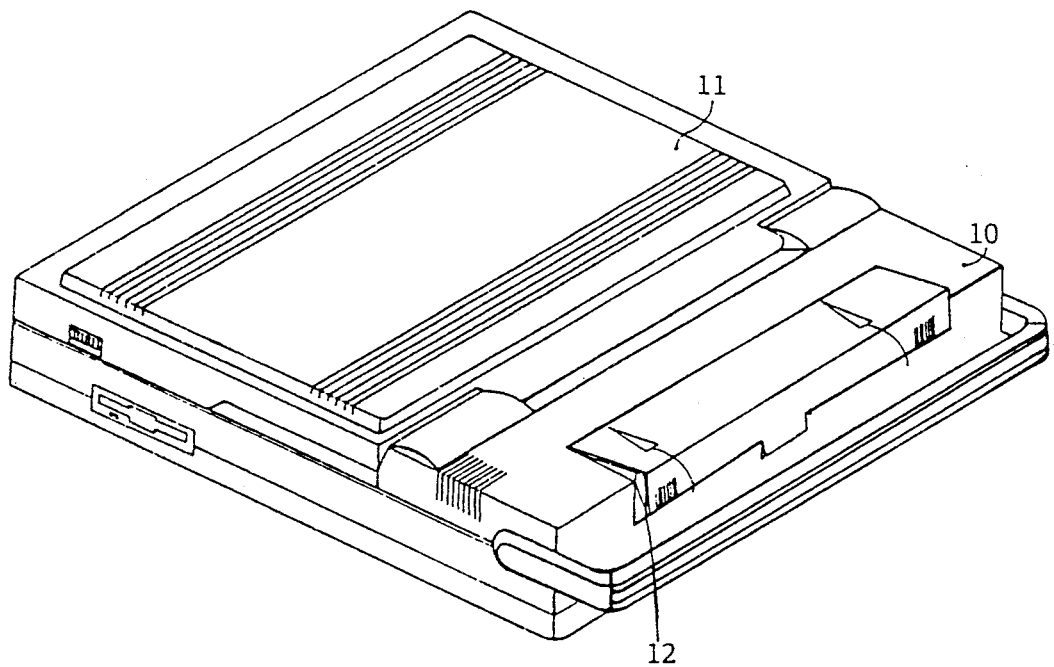
FIG: 1-1
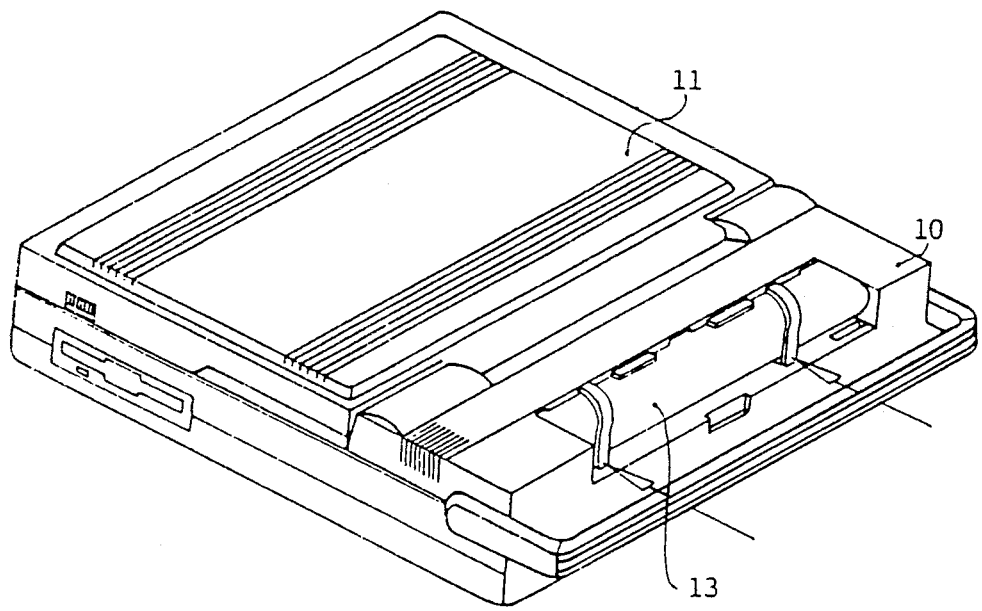
FIG: 1-2

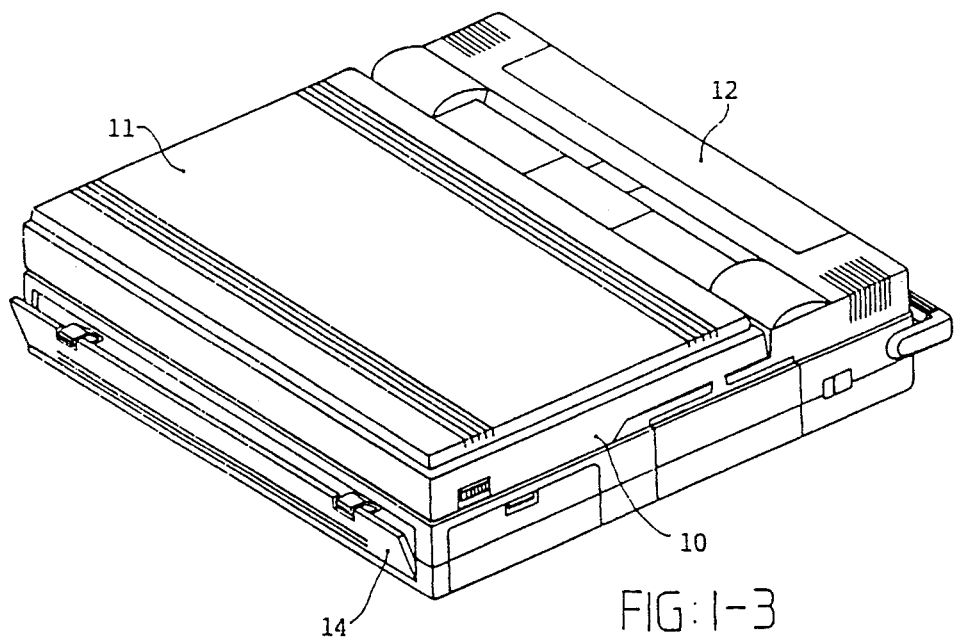
FIG: 1-3
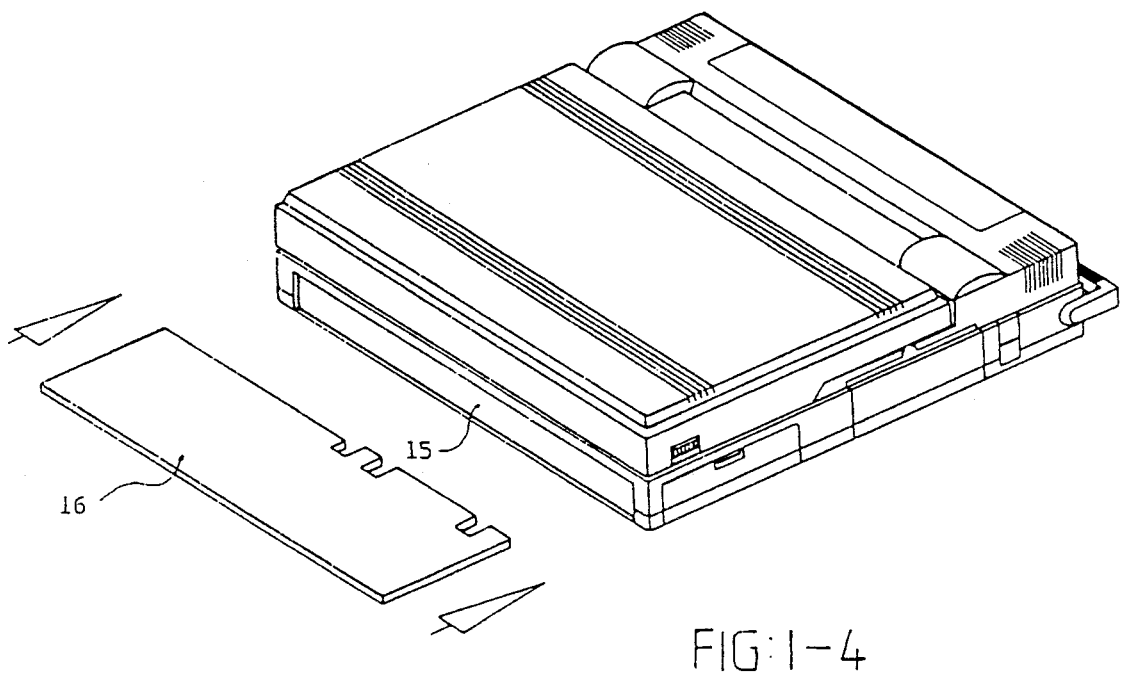
FIG: 1-4

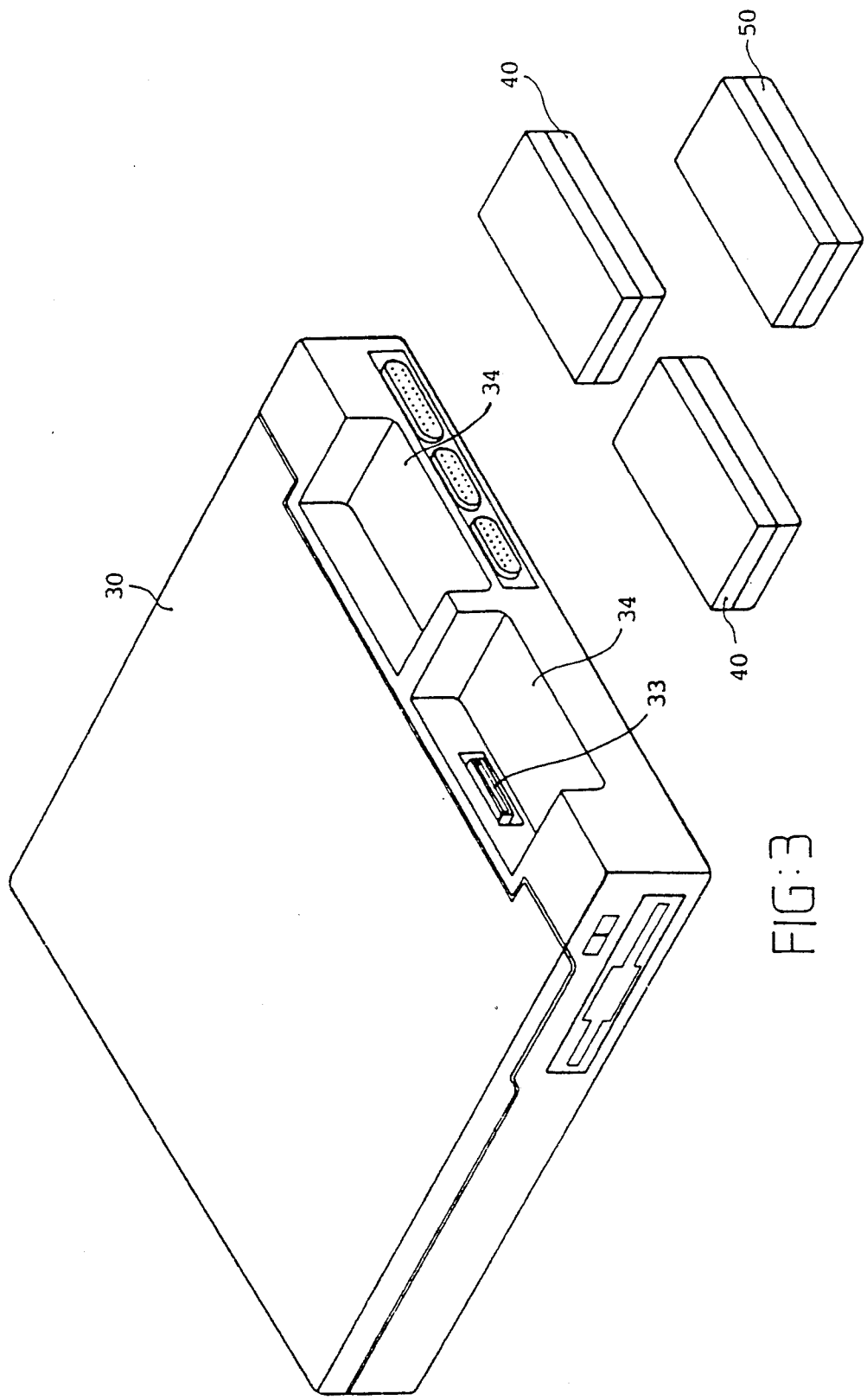
FIG:3

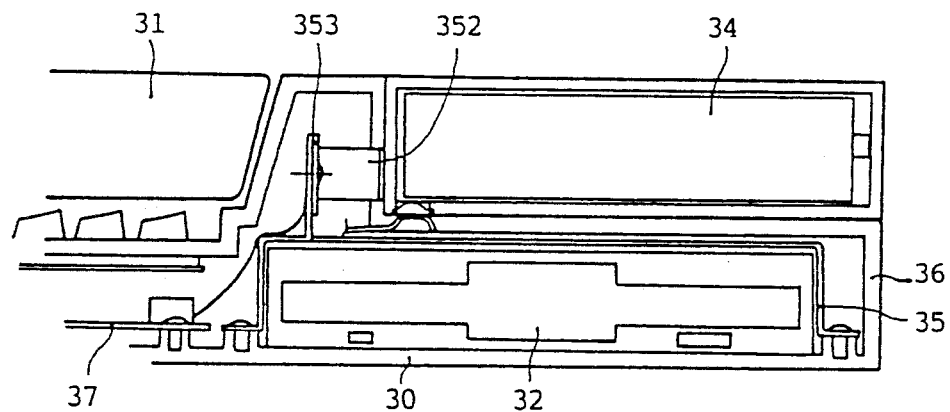
FIG: 4-1
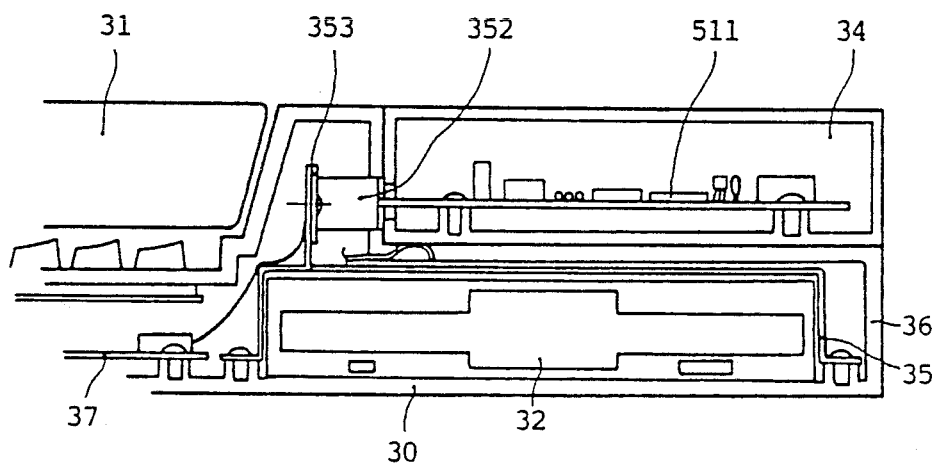
FIG: 4-2

BATTERY AND EXPANSION SLOT CHANGEABLE COMPUTER

BACKGROUND OF THE INVENTION

In recent years, because of the fast development in electronic technology portable computers, more particularly lap-top type or note book type computers become more and more popular. The main advantage of portable computers is that they can be conveniently carried with oneself for use at anytime and anywhere. However, in designing a portable computer, one may encounter two problems. The first problem is that the battery which provides a computer with necessary working voltage occupies space and increases the total weight of a computer. When AC power or car power source is utilized for a portable computer, the battery of such a portable computer becomes useless and somewhat a burden. The other problem in designing a portable computer is the limitation of the available space for expansion cards. Unlike regular desktop computers which generally comprise several expansion slots for external expansion. In case to provide more expansion slots, the size of a portable computer will become more heavy and its acceptability to the consumers will be reduced. Therefore, regular portable computers generally do not have expansion slots for external connection.

DESCRIPTION OF THE PRIOR ART

FIGS. 1-1-1-4 illustrate a lap-top computer according to the prior art. As illustrated, a screen display cover 11 is pivotably mounted on the top of a computer mainframe 10. A battery cover 12 is made on the top of such a computer mainframe 10 back to the screen display cover 11. The battery cover 12 can be lifted for mounting a set of batteries 13. An expansion slot cover 14 is pivotably connected to the mainframe 10 at the front side to cover an expansion slot 15 into which expansion slot 15 a variety of expansion cards 16 can be inserted to connect to the master board of the computer. The main disadvantage of this type of lap-top computer is the difficulty in mounting and fastening an expansion card in the expansion slot.

FIG. 2 illustrates another type of lap-top computer according to the prior art, in which the main body 20 of a computer is coupled with an expansion chassis 21. This type of lap-top computer is relatively expensive to manufacture and more inconvenient to carry.

BRIEF DESCRIPTION OF THE DRAWINGS

FIGS. 1-1-1-4 are schematic drawings of a lap-top computer of the prior art, illustrating the mounting therein of an expansion card and a battery set;

FIG. 2 is a schematic drawing of a lap-top computer of the prior art, illustrating the mounting of a computer main body on an expansion chassis;

FIG. 3 is a perspective view of an embodiment of the present invention; and

FIGS. 4-1 and 4-2 are sectional view of the embodiment of FIG. 3.

DESCRIPTION OF THE PREFERRED EMBODIMENTS

Figure 2:
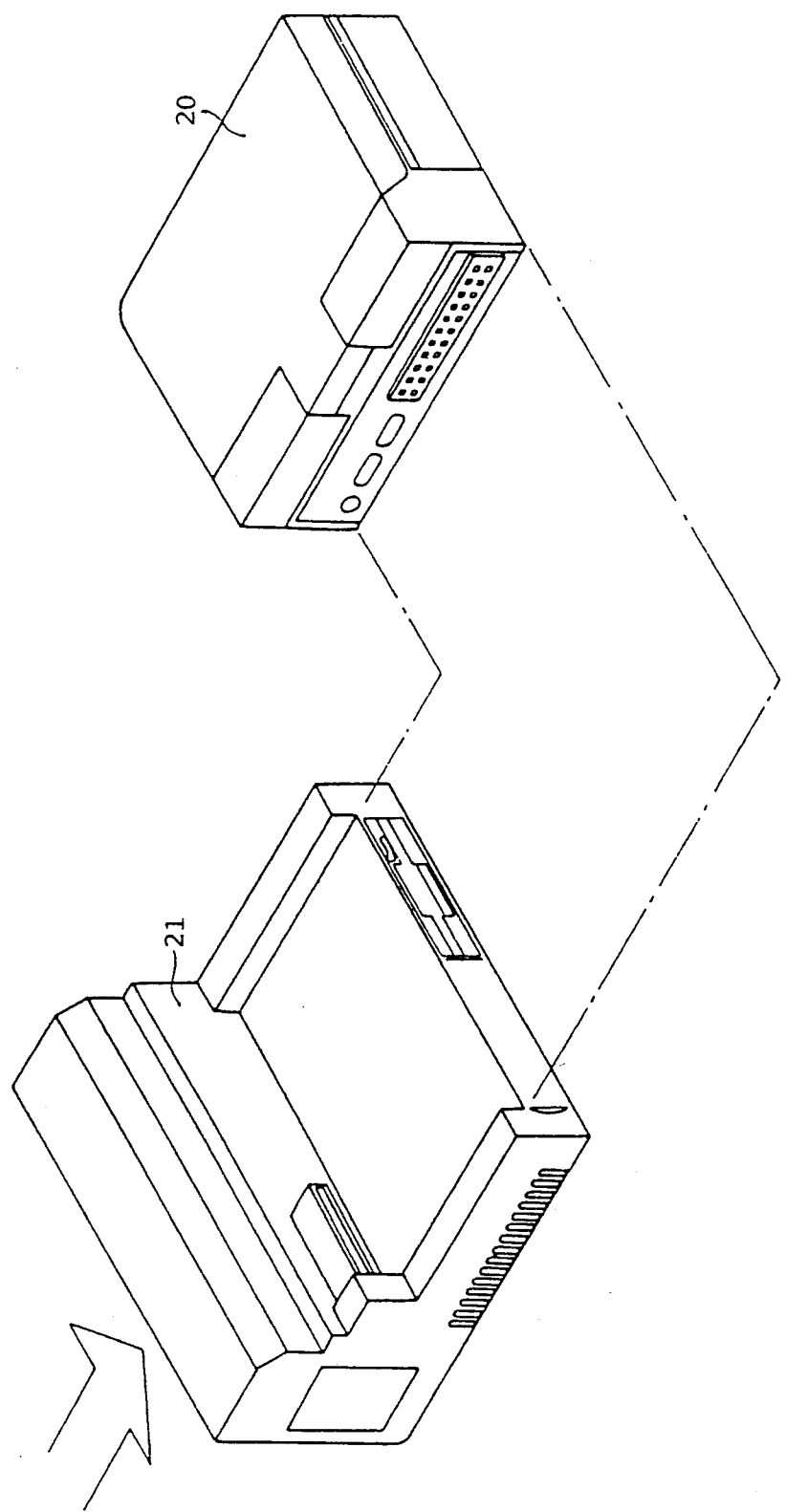

Referring to FIGS. 3 and 4, a battery and expansion slot changeable computer in accordance with the present invention is generally comprised of a main body 30 matching with several battery sets 40 and expansion cards 50.

The main body 30 is generally comprised of a screen display 31, a floppy disc drive 32, input/output terminals 33, and other parts including keyboard, master board . . . etc. The mainframe of the main body 30 comprises two receiving chambers 34 at the back side for the setting therein of the batteries sets 40 and the expansion cards 50.

The battery sets 40 have each a cassette-like structure in size corresponding to the receiving chambers 34. The expansion cards 50 also have each a cassette-like structure in size corresponding to the receiving chambers 34. In other words, the battery sets 40 and the expansion cards 50 can be alternatively received in either receiving chambers 34.

Referring to the sectional view of FIGS. 4-1 and 4-2, the floppy disc drive 32 is retained by a substantially inversely U-shaped frame 35 which is bilaterally secured to the mainframe 36. A connector 352 extends upward from the inversely U-shaped frame 35 with its plug hole facing toward the receiving chambers 34.

The battery sets 40 are each comprised of several dry batteries connected in series and received in a case. The main cord of each battery set 40 extends from the three conductive contact points (positive, negative and grounding) on the bottom of such a battery set for connection to a corresponding port on the main body 30. The battery sets 40 can be connected in parallel with one another. Therefore, when the power of a battery set 40 is going to be used up during the operation of the computer, another battery set 40 can be attached to provide working voltage for continuous operation to prevent from interruption of data processing. This design is very helpful when the computer is used outdoors where AC power is not available.

As described above, the battery sets 40 can be connected in parallel with one another. We can place one battery set 40 and one expansion card 50 in the two receiving chambers 34 respectively. The expansion cards 50 comprise each a PC board interface circuit 511 for MODEM, LAM, CARD etc., which can be horizontally inserted in the connector 352. As an alternate form of the present invention, the expansion cards 50 or the connector 352 can be connected to the master board 37 of the computer by a bus line 353.

When the computer is used indoors, working voltage can be provided from regular AC power source through a transformer. Thus, the battery sets 40 can be removed from the receiving chambers 34, and two expansion cards 50 can be set therein to expand the operational function of the computer.

As described above, the present invention is to provide such a kind of battery and expansion slot changeable computer which can achieve the following advantages:

(1) One battery set can be connected in parallel to another to extend working voltage supplying time. Therefore, when one battery set is used up, data processing can be continuously operated by means of the power supply from another battery set.

(2) Expansion cards are designed in a cassette-like structure so that they can be conveniently connected to the computer without using any screws or other fastening means. The cassette-like structure is convenient for carriage and the circuit therein can be well protected. According to test report, it takes 46.3 seconds and 39.5 seconds respectively in securing an expansion card to and removing an expansion card from a conventional computer. According to the present invention, it requires only 3.2 seconds and 2.2 seconds respectively. (Of course, the connection of an expansion card or a battery set to a receiving chamber of a computer according to the present invention can be variously made through hook joint, tenon-and-mortise, tongue-and-groove, etc.).

(3) Because of the high space utility of the receiving chambers for mounting battery sets and expansion cards alternatively the size and weight of a computer can be minimized. For example, when an expansion card of MODEM is used for information transmission through a telephone, the battery sets in the receiving chambers can be removed for electric charging, and an AC power is connected to the computer to provide working voltage.

(4) In addition to the aforesaid three advantages, the outer configuration of the present invention provides a sense of beauty to attract consumers.

As indicated, the present invention may be variously embodied. Recognizing that various modifications been apparent the scope herein shall be deemed as defined in the claims set forth hereinafter.

What is claimed is:

1. A battery and expansion slot changeable computer, including a main body comprising two receiving chambers at the back side for the setting therein of one or more battery sets and one or more expansion cards alternatively, said receiving chambers having each a contact for the connection thereto of the contact of said battery sets and one of said receiving chambers having internally a connector for the connection thereto of the connecting end of either of said expansion cards to connect to the main line of the computer.

2. A battery and expansion slot changeable computer as claimed in claim 1, wherein said battery sets comprise each a plurality of batteries connected in series, and said two receiving chambers are connected in parallel.

3. A battery and expansion slot changeable computer as claimed in claim 1, which includes a main body comprising one or more receiving chambers, one or more battery sets, and one or more expansion cards, wherein the quantity of said battery sets and expansion cards can be equal to or different from the quantity of said receiving chambers.

* * * * *